United States Patent
Trabesinger et al.

(10) Patent No.: US 7,507,443 B2
(45) Date of Patent: Mar. 24, 2009

(54) PRIMER WITH LONG OPEN TIME FOR POLYMERIC SUBSTRATES

(75) Inventors: Gerald Trabesinger, Kaltbrunn (CH); Thomas Wirz, Zürich (CH); Fabian Venetz, Boniswil (CH)

(73) Assignee: Sika Technology AG, Baar (CH)

( * ) Notice: Subject to any disclaimer, the term of this patent is extended or adjusted under 35 U.S.C. 154(b) by 380 days.

(21) Appl. No.: 10/521,597

(22) PCT Filed: Jul. 11, 2003

(86) PCT No.: PCT/EP03/07506

§ 371 (c)(1),
(2), (4) Date: Jan. 20, 2006

(87) PCT Pub. No.: WO2004/007585

PCT Pub. Date: Jan. 22, 2004

(65) Prior Publication Data

US 2006/0167190 A1    Jul. 27, 2006

(30) Foreign Application Priority Data

Jul. 15, 2002    (EP) .................................. 02015771

(51) Int. Cl.
*C09D 175/04*    (2006.01)

(52) U.S. Cl. ..................... 427/387; 427/386; 524/770; 524/773; 525/457; 528/27; 528/28; 528/59

(58) Field of Classification Search ..................... None
See application file for complete search history.

(56) References Cited

U.S. PATENT DOCUMENTS

| 5,221,725 | A | * | 6/1993 | Izumo et al. ................... 528/64 |
| 5,223,575 | A | | 6/1993 | Mori et al. |
| 5,468,317 | A | * | 11/1995 | Hsieh .......................... 156/108 |
| 5,468,833 | A | * | 11/1995 | Schwindt et al. .............. 528/67 |
| 5,576,558 | A | | 11/1996 | Matsuda et al. |
| 6,153,699 | A | | 11/2000 | Matsuda et al. |
| 2002/0002231 | A1 | | 1/2002 | Merz et al. |

FOREIGN PATENT DOCUMENTS

| EP | 1 149 856 A | 10/2001 |
| EP | 1 172 424 A | 1/2002 |
| WO | WO 94 29390 A | 12/1994 |

* cited by examiner

*Primary Examiner*—David Buttner
(74) *Attorney, Agent, or Firm*—Oliff & Berridge, PLC

(57) ABSTRACT

The invention relates to a primer composition, comprising at least one polyurethane prepolymer (A) with isocyanate terminal groups, at least one aliphatic polyisocyanate (B), at least one aromatic polyisocyanate (C) and at least one reaction product (D), which may be obtained from at least one epoxysilane and at least one aminosilane or from at least one epoxysilane and at least one mercaptosilane. The invention relates to the use of the primer composition as primer for adhesives, sealants and floor coatings.

24 Claims, No Drawings the same time there is also assurance of effective adhesion for short venting times or for short waiting times between primer application and adhesive application.

PRIMER WITH LONG OPEN TIME FOR POLYMERIC SUBSTRATES

TECHNICAL FIELD

The invention relates to primers having long open times and also good adhesion for problematic polymeric substrates.

PRIOR ART

Adhesives, coatings, sealants, floor coverings, and other systems are based on reactive binders. The adhesion of these reactive systems to a variety of substrates is deficient in many cases. In many cases in the art, therefore, "primers" are used. A primer forms an adhesive "bridge" between the substrate and the binder employed. A primer is likewise a chemically reactive system and is applied to the substrate. In order for the primer to develop adhesion with the substrate the primer must have a certain time, known as the venting time, available in order to form a film and to undergo at least partial crosslinking, before the adhesive or another reactive system can be applied. The application of this system, however, is limited, during the "open time", in which the adhesion to the primer is still ensured. If the open time is exceeded then adhesion to the primer is no longer ensured. The open time is therefore determined, in experiments in which different periods of time are maintained between primer application and adhesive application and the adhesion of the bonds is measured after the adhesive has cured. In model terms the adhesion between primer and adhesive or another reactive system is developed by means of a reaction between these materials. In order to ensure rapid and cost-effective processing it is necessary in a technical, industrial application, for the venting time to be as short as possible. In other words, the development of adhesion of the primer with the substrate must take place as rapidly as possible, so that application of an adhesive or another reactive system can take place as quickly as possible. In this connection, however, the problem occurs that the manufacturing operation is interrupted as a result, for example, of technical disruptions, end of shift or weekend, so that a relatively long time, ranging from a few hours to days or even weeks, may elapse between primer application and application of the adhesive or other reactive system. This is particularly disruptive in industrial applications which run continuously. Furthermore, in automaking, there is a trend toward shifting the pretreatment away from the industrial manufacturing line and into the supplier's plant, so that between primer application at the supplier's plant and application of the adhesive in the manufacturing plant an open time of up to several weeks might elapse.

In order to ensure effective adhesion even in these cases there is a great need for primers having long open times.

Plastics, moreover, are increasingly being encountered as substrates. Plastics are used primarily on account of their light weight and the absence of corrosion. In respect of adhesion of adhesives, for example, plastics are in many cases problematic, however. This has become apparent especially for one-component polyurethane adhesives in the case of materials comprising ABS (acrylonitrile/butadiene/styrene), EP-GRP (epoxy-glass fiber reinforced plastics), polyester-GRP (PES-GRP; polyester-glass fiber reinforced plastics), poly(methyl methacrylate) (PMMA), and polycarbonate (PC). PDMS-PC and PDMS-PMMA have proven particularly problematic in this respect. These materials are a polycarbonate and, respectively, a poly(methyl methacrylate) each of which has been provided with a polydimethylsiloxane-based coating. PDMS-PC and PDMS-PMMA have on the one hand the property of being highly scratch-resistant and, on the other hand, are very hydrophobic. Because of these properties these material are being employed ever more frequently in automaking and shipbuilding. In view of their hydrophobic nature, however, there have to date been limits on the applications which require adhesion with a reactive system, such as with an adhesive, for example.

Polyisocyanate-based primers have been very well known for a long time.

U.S. Pat. No. 6,153,699 describes a primer which in addition to a silicone-modified acrylate comprises a polyisocyanate. A preferred polyisocyanate comprises adducts of hexamethylene diisocyanate (HDI) and toluene diisocyanate (TDI). This primer exhibits particularly good adhesion to polyvinyl chloride (PVC). On the difficult-to-bond substrates such as PDMS-PC, however, the promotion of adhesion is inadequate. Moreover, polyacrylate-based and polyester-based primers frequently possess inadequate wetting and inadequate adhesion to plastics substrates, such as ABS and PC, for example.

U.S. Pat. No. 5,576,558 describes a primer for polypropylene with a 40% degree of filling or for automotive coating materials which are difficult to bond. Besides the isocyanates the primer comprises an inorganic phosphate. Because of the rapid aromatic isocyanates used this primer is unsuitable for long open times, since the isocyanates used react relatively rapidly with the atmospheric moisture.

EP 1 172 424 A1 describes a primer for long open times and adhesion to glass and silicone hardcoats. The precise nature of this silicone hardcoat, however, is not described in any greater detail. Besides an acrylate resin, an epoxy resin and carbon black the primer comprises an adduct of amino- and dialkoxy-/trialkoxy silane mixture. The silane adduct is present in a very large amount, of 10%-35%, based on the weight of the primer. Such a large concentration is a necessity for such a primer, in order to ensure that adhesion is developed. The high concentration of the silane adduct, however, means that a silane-based primer of this kind is not suitable for polyurethane adhesives, since, although large amounts of alkoxysilane groups are required for developing sufficient adhesion to glass, these large amounts then give off low molecular alcohols such as ethanol or methanol in the course of hydrolysis. The primary alcohol formed reacts in turn with isocyanate groups of a polyurethane adhesive, so rendering them no longer available either for reaction with the primer or for curing of the adhesive, with the consequence of inadequate mechanical properties of the adhesive bond at the primer/adhesive interface.

With the prior art it has not been possible to date to obtain a primer which at one and the same time exhibits good adhesion to problematic more polymeric substrates and has a long open time.

OUTLINE OF THE INVENTION

It is the object of this invention to overcome the described disadvantages and problems of the primers for organic polymers and to provide a primer which at one and the same time exhibits good adhesion to problematic more polymeric substrates and has a long open time. Unexpectedly it has been found that the disadvantages of the prior art could be removed by the inventive primer composition according to claim 1. At the same time there is also assurance of effective adhesion for short venting times or for short waiting times between primer application and adhesive application.

The present invention relates to a primer composition comprising at least one polyurethane prepolymer A having isocyanate end groups, at least one aliphatic polyisocyanate B, at least one aromatic polyisocyanate C, and at least one reaction product D which is obtainable from at least one epoxysilane and at least one aminosilane or from at least one epoxysilane and at least one mercaptosilane.

WAY OF IMPLEMENTING THE INVENTION

The present invention relates to a primer composition comprising at least one polyurethane prepolymer A having isocyanate end groups, at least one aliphatic polyisocyanate B, at least one aromatic polyisocyanate C, and at least one reaction product D which is obtainable from at least one epoxysilane and at least one aminosilane or from at least one epoxysilane and at least one mercaptosilane.

"Polyol" and "polyisocyanate" describes, in this connection and below, that the number of the respective functional groups is two or more.

The polyurethane prepolymer A is prepared from at least one polyol and at least one polyisocyanate. The reaction with polyol with a polyisocyanate may take place by reaction of the polyol and polyisocyanate by customary methods, at temperatures for example at from 50 to 100° C., with or without the use of suitable catalysts and/or solvents which are not isocyanate-reactive at room temperature, the polyisocyanate being used in stoichiometric excess. The reaction product formed is the polyurethane prepolymer A having isocyanate end groups.

The polyols used for preparing the prepolymer are those such as are customarily used in polyurethane chemistry. Besides hydroxyl-containing polyacrylates, polyesters, polycaprolactones and PET (polyethylene terephthalate) polyols obtained from PET, particular interest as polyols attaches to the polyoxyalkylene polyols, especially polyoxypropylene polyols, preferably polyoxypropylene diols or triols. Preferred polyoxyalkylene polyols are polymerized from ethylene oxide and/or 1,2-propylene oxide. The molecular weight of the polyols is typically advantageously 250-20 000 g/mol, in particular 500-10 000 g/mol. It is preferred to use polyols having a molecular weight of 800-4000 g/mol. By "molecular weight" or "molar weight" is meant, in this connection and below, always the molecular weight average $M_w$.

The polyisocyanate used for preparing the polyurethane prepolymer A is an aromatic or an aliphatic polyisocyanate. By "aromatic polyisocyanate" is meant in this connection a polyisocyanate in which the isocyanate (—NCO—) group is directly pendent from an aromatic structure, advantageously a C6 ring, whereas by an "aliphatic polyisocyanate" is meant a polyisocyanate in which the NCO group is not pendent directly from the aromatic structure. There are, however, also polyisocyanates, especially reaction products of mixtures of aliphatic and aromatic polyisocyanates, which contain both aromatic and aliphatic NCO groups in the same molecule. Such molecules are in this connection classified both as aromatic and as aliphatic polyisocyanates.

Polyisocyanates suitable for preparing the polyurethane prepolymer A include in particular those from the following list:

2,4- and 2,6-tolylene diisocyante (TDI) and any mixtures of these isomers; 4,4'-diphenylmethane diisocyanate (MDI), the positionally isomeric diphenyl-methane diisocyanates; dialkyl- and tetraalkyl-diphenylmethane diisocyanates; 4,4'dibenzyl diisocyanate, 1,3- and 1,4-phenylene diisocyanate; the isomers of naphthylene diisocyanate, of xylylene diisocyanate, of triphenylmethane triisocyanate, and the isomer mixtures thereof; tris(p-isocyanatophenyl) thiophosphate (available, for example, as Desmodur RFE from Bayer);

hexamethylene diisocyanate (HDI), 2,2,4- and 2,4,4-trimethyl-1,6-hexamethylene diisocyanate, tetramethoxybutane 1,4-diisocyante, butane-1,4-diisocyanate, dicyclohexylmethane diisocyanate, cyclohexane 1,3- and 1,4-diisocyanate, 1,12-dodecamethylene diisocyanate, diisocyanates of dimeric fatty acids; lysine methyl ester diisocyanate, 1-isocyanato-3,3,5-trimethyl-5-isocyanatomethylcyclohexane (i.e. isophorone diisocyanate or IPDI), hydrogenated diphenylmethane diisocyanate, hydrogenated 2,4- and 2,6-tolylene diisocyanate;

oligomers, polymers or copolymers of these monomers, such as polymeric HDI, polymeric MDI, available commercially for example as Voranate M-580 (Dow), or biurets, uretdiones and isocyanurates of these monomers, especially HDI biurets, such as are available commercially, for example, as Desmodur N-100 (Bayer), Luxate HDB 9000 (Lyondell), HDI trimers, such as are available commercially, for example, as Desmodur N-3300 (Bayer), Desmodur N-3600 (Bayer), Luxate HT 2000 (Lyondell), HDI dimers, such as are available commercially, for example, as Desmodur N-3400 (Bayer), Luxate HD 100 (Lyondell), IPDI trimers, such as are available commercially, for example, as Desmodur Z 4470 (Bayer), Vestanat T 1890/100 (Hüls), Luxate IT 1070 (Lyondell), TDI trimer, such as is available commercially, for example, as Desmodur IL (Bayer), TDI adducts, such as are available commercially, for example, as Desmodur L (Bayer), TDI/HDI polymer, such as is available commercially, for example, as Desmodur HL (Bayer), Polurene IK D (Sapici), Hartben AM 30 (Benasedo), and polymeric MDI.

For primers which are used in areas where flame prevention or flame retardance is of importance, halogenated polyisocyanates can be used with advantage.

The primer composition further comprises at least one aliphatic polyisocyanate B. Preference is given to aliphatic polyisocyanates selected from the above list of the polyisocyanates for preparing the prepolymer A. Particular preference is given to aliphatically NCO-bearing isocyanurates B1 or aliphatically NCO-bearing biurets B2. By "aliphatically NCO-bearing" is meant that the NCO group is not directly pendent from an aromatic structure. Preferred aliphatically NCO-bearing isocyanurates B1 are IPDI isocyanurates, such as IPDI trimer, for example, in which, formally, three molecules of IPDI are interconnected to form an isocyanurate, so that formally per molecule three NCO groups remain free.

Preferred aliphatically NCO-bearing biurets B2 are HDI biurets, such as, for example, HDI biurets in which, formally, three molecules of HDI react with one another to form a biuret, so that formally per molecule three NCO groups remain free.

In one particularly preferred embodiment the primer composition at the same time comprises at least one NCO-bearing cyanurate B1 and at least one aliphatically NCO-bearing biuret B2.

The primer composition further comprises at least one aromatic polyisocyante C. Preference is given to aromatic polyisocyanates selected from the above list of polyisocyanates for preparing the prepolymer A. Particular preference is given to aromatically NCO-bearing isocyanurates. By "aromatically NCO-bearing" is meant that the NCO group is directly pendent from an aromatic structure. Particular preference is given in particular to aromatically NCO-bearing isocyanurates which are prepared from toluene diisocyanate and hexamethylene diisocyanate, such as, for example, the isocyanurate which is produced formally from one molecule of HDI and four molecules of TDI, forming two isocyanurate groups and four remaining aromatic NCO groups.

The primer composition further comprises at least one reaction product D obtainable from at least one epoxysilane and at least one aminosilane or from at least one epoxysilane and at least one mercaptosilane. An "epoxysilane" is a silane bearing epoxy groups, an "aminosilane" a silane which bears amino groups, and "mercaptosilane" a silane which bears mercapto groups.

The reaction product D can be prepared by reacting the epoxysilane with an aminosilane or with a mercaptosilane in the absence of moisture. In the course of the reaction it should be borne in mind in this connection that the ratio of the active amine hydrogens or mercapto groups in respect of the epoxy groups is of great importance for the amounts of the reactants employed.

In this connection, for the aminosilane/epoxysilane adduct, the ratio of the number of active amine hydrogens/number of epoxy groups advantageously=3:1-1:3. Preference is given to a ratio of 2:1-1:1.5. A particularly advantageous ratio is that from about 2:1-about 1:1.

In this connection, for the mercaptosilane/epoxysilane adduct, the ratio of the number of mercapto groups/number of epoxy groups advantageously=1.5:1'-1:1.5. Preference is given to a ratio of 1.2:1-1:1.2. A particularly advantageous ratio is that of about 1:1, so that the reaction takes place roughly stoichiometrically.

Suitability as the epoxysilane for preparing the reaction product D is possessed in particular by epoxydimethoxymethylsilanes, epoxytrimethoxysilanes or epoxytriethoxysilanes, especially 3-glycidyloxypropylmethyldimethoxysilane, 2-(3,4-epoxycyclohexyl)ethylmethyldimethoxysilane. Preference is given to epoxytrimethoxysilanes and epoxytriethoxysilanes, especially 3-glycidyloxypropyltrimethoxysilane, 3-glycidyloxypropyltriethoxysilane or 2-(3,4-epoxycyclohexyl)ethyltrimethoxysilane. Particular preference is given to 3-glycidyloxypropyltrimethoxysilane.

Suitability as mercaptosilane for preparing the reaction product D is possessed by 2-mercaptoethyltriethoxysilane, 3-mercaptoethylmethyldimethoxysilane, 3-mercaptopropyldimethylmethoxysilane, 3-mercaptopropylethyldiethoxysilane, 3-mercaptopropylethyldimethoxysilane, 3-mercaptopropylmethyldiethoxysilane, 3-mercaptopropylmethyldimethoxysilane, 3-mercaptopropyltriethoxysilane, 3-mercaptopropyltrimethoxysilane, preferably 3-mercaptopropyltriethoxysilane, 3-mercaptopropyltrimethoxysilane, especially 3-mercaptopropyltrimethoxysilane.

Suitability as aminosilanes for preparing the reaction product D is possessed, for example, by aminodiethoxymethylsilane, aminodimethoxymethylsilane, amino-trimethoxysilane or an aminotriethoxysilane. Suitable examples of aminosilanes are 3-aminoisobutyltrimethoxysilane, 3-aminopropyltrimethoxysilane, bis(trimethoxysilylpropyl)amine, N-(2-aminoethyl)-3-amino-2-methylpropyltrimethoxysilane, N-(2-aminoethyl)-3-aminopropyltrimethoxysilane, N-(2-aminoethyl)aminomethyltrimethoxysilane, N-(n-butyl)-3-aminopropyltrimethoxysilane, N-methyl-3-aminopropyltrimethoxysilane, N-phenyl-3-aminopropyltrimethoxysilane, 3-aminopropyltriethoxysilane, aminomethyltriethoxysilane, N-aminoethyl-3-aminopropyltriethoxysilane, 3-aminopropylmethyldiethoxysilane, 3-aminopropylmethyldimethoxysilane, 3-aminomethyldiethoxysilane, N-(2-aminoethyl)-3-aminopropylmethyldimethoxysilane, N-aminoethyl-3-aminopropylmethyldimethoxysilane or N-aminoethyl-3-aminopropylmethyldiethoxysiane.

Particular suitability is possessed by trimethoxysilanes having primary amino groups or by triethoxysilanes having primary amino groups. Particular preference is given to 3-(2-aminoethylamino)propyltrimethoxysilane or 3-aminopropyltrimethoxysilane.

With particular preference the reaction product D is prepared from 3-glycidyloxypropyltrimethoxysilane and 3-aminopropyltrimethoxysilane.

The amount of the reaction product D is to be chosen in this connection such that the fraction is within the range of 0.5%-15% by weight, in particular 2%-10% by weight, based on the weight sum of A+B+C+D. If the fraction is lower the adhesion is inadequate, whereas if the fraction is greater the primer composition lacks sufficient storage stability.

According to one embodiment the primer composition further comprises at least one solvent which is not NCO-reactive at room temperature. Suitable such solvents include, in particular, ketones, esters, ethers, aliphatic hydrocarbons, aromatic hydrocarbons, halogenated hydrocarbons, and N-alkylated lactams.

Particularly suitable ketones include, in particular, acetlacetone, mesityl oxide, cyclic ketones and dialkyl ketones. Cyclic ketones having ring sizes of from 5 to 9 are particularly suitable cyclic ketones, especially methylcyclohexanone and cyclohexanone.

Preferred dialkyl ketones are ketones having C1 to C6 alkyl substituents, it being possible for the alkyl substituents to be identical or different. Preference is given to acetone, diisobutyl ketone, diethyl ketone, dipropyl ketone, methyl amyl ketone, methyl butyl ketone, methyl propyl ketone, methyl ethyl ketone (MEK), and n-hexyl methyl ketone.

Preferred esters are alkyl carboxylic esters with C1 to C6 alkyl substituents, preferably acetates, especially ethyl acetate, propyl acetate, isopropyl acetate, butyl acetate, isobutyl acetate, hexyl acetate or amyl acetate; butyrates, especially isobutyl isobutyrate; propionates, especially ethyl propionate; formates, malonates, especially dimethyl malonate or diethyl malonate. Diethyl malonate and dimethyl malonate additionally possess a stabilizing effect on organotin catalysts.

Preferred ethers are ketone ethers, ester ethers and dialkyl ethers having C1 to C6 alkyl substituents, it being possible for the alkyl substituents to be identical or different, especially diisopropyl ether, diethyl ether, dibutyl ether, diethylene glycol diethyl ether and ethylene glycol diethyl ether.

Preferred ketone ethers are acetal ethyl ether, acetonyl methanol ether and methyl ethoxyethyl ether.

Preferred ester ethers are diethylene glycol butyl ether acetate, ethylene glycol butyl ether acetate, diethylene glycol ethyl ether acetate, ethylene glycol ethyl ether acetate, 3-methoxybutyl acetate, diethylene glycol methyl ether acetate, and ethylene glycol methyl ether acetate.

Examples of suitable aliphatic or aromatic hydrocarbons include toluene, xylene, heptane, octane and also various petroleum fractions such as naphtha, white spirit, petroleum ether, mineral spirit, etc.

Examples of suitable halogenated hydrocarbons include methylene chloride, ethylene chloride, trichloroethylene, perchloroethylene, chloroform, ethylene trichloride, bromobenzene, chlorobenzene, and dichlorobenzene.

As N-alkylated lactams preference is given to N-methylpyrrolidone (NMP).

With particular preference the solvent is selected from the group consisting of methyl ethyl ketone, acetone, ethyl acetate, butyl acetate, hexyl acetate, and diethyl malonate.

The primer composition may further comprise at least one catalyst for the reaction of the isocyanate groups, additionally. This catalyst is preferably an organotin catalyst, selected in particular from the group consisting of dibutyltin dilaurate, dibutyltin dichloride, tin-thioester complexes, mono-n-butyltin trichlorides, di-n-butyltin oxide, di-n-butyltin diacetate, and dibutyltin carboxylate. Examples of suitable nonorganotin catalysts are Bi(II) octoate, Bi(II) neodecanoate, and Zn(II) 2-ethylhexanoate.

In addition to the primer composition it is possible to add further adhesion promoters, especially silanes. With advantage these are silanes selected from the group consisting of 3-glycidyloxypropyltrimethoxysilane, 3-glycidyloxypropyltriethoxysilane, 2-(3,4-epoxycyclohexyl)ethyltrimethoxysilane, 3-ureidopropyltriethoxysilane, 3-(4,5-dihydroimidazolyl)propyltriethoxysilane, 3-methacryloyloxypropyltrimethoxysilane (monomeric or polymerized), vinyltrimethoxysilane (monomeric or polymerized), vinyltriethoxysilane (monomeric or polymerized), vinyltris(2-methoxyethoxy)silane (monomeric or polymerized), 1,3,5-tris[3-(trimethoxysilyl)propyl]-1,3,5-triazine-2,4,6-(1H,3H,5H)-trione, methyltrimethoxysilane, methyltriethoxysilane, trimethoxypropylsilane, triethoxypropylsilane, 2-methylpropyltrimethoxysilane, triethoxyisobutylsilane, octyltrimethoxysilane, octyltriethoxysilane, hexadecyltrimethoxysilane, cyclohexyldimethoxymethylsilane, 3-isocyanatopropyltrimethoxysilane, 3-isocyanatopropyltriethoxysilane, 3-methacryloyloxypropyltriethoxysilane (monomeric or polymerized). Particular preference is given to 3-glycidyloxypropyltrimethoxysilane and 3-glycidyloxypropyltriethoxysilane.

Additionally it is possible to use additives and fillers that are customary in primer chemistry. Examples, of nonlimiting nature, of these are silicas, talc, carbon black, stabilizers, Bentones, and chemical and physical dryers.

The composition described is prepared and kept in the absence of moisture.

The primer composition is suitable as primer for a variety of substrates. It is particularly suitable for glass, glass ceramics, metals and alloys, and also various plastics. Preferred plastics that may be mentioned include, in particular, ABS, PVC, PES-GRP, EP-GRP, PMMA, PC, PDMS-PC, PDMS-PMMA and also paints. The primer composition of the invention is especially suitable for PDMS-PC or PDMS-PMMA substrates. The various substrates are advantageously pretreated prior to application. Such pretreatment methods include physical and/or chemical pretreatment, such as abrasion, sandblasting, brushing or the like, or by treatment with cleaners, solvents, adhesion promoters and/or adhesion promoter solutions.

The primer is applied to a substrate by means of brush, felt, cloth or sponge. This application may take place by hand or automatically, in particular by means of robots. It is also possible for two or more coats of the primer composition to be applied.

The primer composition is used with advantage as a primer for adhesives, sealants or floor coverings, especially 1-component moisture-curing polyurethane adhesives or sealants based on polyurethanes or polyurethane-silane hybrids. Preferred fields of use of these primers are fields in which, inter alia, bonding of industrially manufactured components takes place. These are, in particular, applications where the primer is applied at the plant of a supplier.

EXAMPLES

The following examples are typical examples for the purpose of illustrating the invention.

Preparation of the Prepolymer PREP1

A 5-necked glass apparatus was used which was equipped with a motorized stirrer an $N_2$ connection, a temperature sensor, a reflux condenser, and a dropping funnel. All of the reactions described below were carried out under nitrogen.

531.6 g of Desmodur HL were dissolved in 212.1 g of methyl ethyl ketone. After gentle heating, 44.2 g of Voranol P-1010 (polypropylene glycol, average molecular weight 1000 g/mol, available from Dow), in solution in 212.1 g of MEK, were added slowly dropwise, via the dropping funnel, to the isocyanate solution. After the end of dropwise addition the mixture was stirred for a further 5 hours. The end of reaction was ascertained by measuring the NCO concentration.

Preparation of the Primer

The primers PR1 to PR8 were prepared in accordance with the composition in Table 1.

The procedure adopted for the preparation was as follows: the prepolymer was introduced, subsequently, where appropriate, the aliphatic isocyanurate was added, and its dissolution was awaited. Subsequently, where appropriate, the aliphatic biuret and also, where appropriate, the aromatic isocyanurate were added. Thereafter, via a peristaltic pump the adduct AD1 of 3-aminopropyltrimethoxysilane and 3-glycidyloxypropyltrimethoxysilane (molar ratio=1:1.32) was added slowly dropwise to the solution. Finally the solution was also diluted with MEK, as indicated in Table 1.

TABLE 1

Examples Compositions

| | Examples | | | | | | | |
|---|---|---|---|---|---|---|---|---|
| | PR1 | PR2 | PR3 | PR4 | PR5 | PR6 | PR7 | PR8 |
| Prepolymer PREP1 [g] | 800 | 800 | 800 | 800 | 800 | 800 | 800 | 800 |
| Desmodur N-100 [g] | 0 | 420 | 0 | 130 | 0 | 420 | 0 | 130 |
| Vestanat T1890/100 [g] | 0 | 0 | 0 | 100 | 0 | 0 | 0 | 100 |
| Desmodur HL [g] | 0 | 0 | 420 | 190 | 0 | 0 | 420 | 190 |
| Epoxysilane/amino-silane adduct AD1 [g] | 0 | 0 | 0 | 0 | 60 | 30 | 30 | 30 |
| MEK [g] | 0 | 380 | 380 | 380 | 0 | 380 | 380 | 380 |

Substrate Preparation and Primer Application

| Substrate | obtained from: |
|---|---|
| ABS | Rocholl, Schönbrunn, Germany |
| EP-GRP | Rocholl, Schönbrunn, Germany |
| PC | Rocholl, Schönbrunn, Germany |
| PDMS-PC | Angst + Pfister, Zurich, Switzerland |

The substrates were cleaned with isopropanol. In the case of PDMS-PC the surface was first activated with Sika® Activator (available from Sika Schweiz AG), by cloth. After a waiting time of 10 minutes the primer was applied.

Adhesive Application and Test Methods

After a waiting time t, specified in Table 2, following the application of the primer, a bead of a polyurethane adhesive was applied to the primer. This was SikaTack®-Ultrafast (available from Sika Schweiz AG) and Sikaflex®-250 DM-1 (available from Sika Schweiz AG). The adhesive was tested after a cure time of 7 days' storage under controlled conditions (23° C., 50% relative humidity).

The adhesion of the adhesive was tested by means of the "bead test". In this test an incision is made at the end just above the adhesion face. The incised end of the bead is held with round-end tweezers and pulled from the substrate. This is done by carefully rolling up the bead on the tip of tweezers, and placing a cut vertical to the bead-drawing direction down to the bare substrate. The rate of bead removal is chosen such that a cut has to be made approximately every 3 seconds. The test length must amount to at least 8 cm. An assessment is made of the adhesive which remains on the substrate after the bead has been drawn off (cohesive fracture). The adhesion properties are evaluated by estimating the cohesive fraction of the adhesion face:

1=>95% cohesive fracture
2=75%-95% cohesive fracture
3=25%-75% cohesive fracture
4=<25% cohesive fracture
5=adhesive fracture The addition of a "P" indicates that the primer detaches from the substrate, and therefore that the adhesion of the primer to the substrate represents a weak point. Test results with cohesive, fractures of less than 75% are considered inadequate.

Results

Table 2 shows the results of the adhesion tests of Examples PR1 to PR8. On the one hand this table shows the adhesion results on exemplarily problematic substrates and in the case of both short and particularly long waiting times between application of the primer and of the adhesives.

TABLE 2

Adhesion results on problematic polymer substrates for different waiting times t between primer application and application of the adhesive.

| | Example | | | | | | | |
|---|---|---|---|---|---|---|---|---|
| | PR1 | PR2 | PR3 | PR4 | PR5 | PR6 | PR7 | PR8 |
| Short waiting times | | | | | | | | |
| EP-GRP (t = 10 min) | | | | | | | | |
| SikaTack ®-Ultrafast | 1 | 1 | 1 | 1 | 1 | 1 | 1 | 1 |
| Sikaflex ®-250 DM-1 | 2 | 1 | 1 | 1 | 2 | 1 | 5 | 1 |
| PC (t = 10 min) | | | | | | | | |
| SikaTack ®-Ultrafast | 1 | 5P | 1 | 1 | 1 | 5P | 1 | 1 |
| Sikaflex ®-250 DM-1 | 2 | 4P | 4 | 1 | 1 | 5P | 4 | 1 |
| PDMS-PC (t = 10 min) | | | | | | | | |
| SikaTack ®-Ultrafast | 3 | 5P | 4P | 1 | 3 | 5P | 3 | 1 |
| Sikaflex ®-250 DM-1 | 3 | 5P | 3P | 1 | 3 | 2P | 4 | 1 |
| Long waiting times | | | | | | | | |
| EP-GRP (t = 17 days) | | | | | | | | |
| SikaTack ®-Ultrafast | 5P | 5P | 5P | 2 | 3P | 2 | 5P | 1 |
| Sikaflex ®-250 DM-1 | 5P | 5P | 5P | 2 | 2P | 2 | 5P | 1 |
| PC (t = 12 days) | | | | | | | | |
| SikaTack ®-Ultrafast | 5 | 5 | 4 | 4 | 5 | 5 | 4 | 2 |
| Sikaflex ®-250 DM-1 | 5 | 5 | 5 | 4 | 5 | 5 | 4 | 2 |
| PDMS-PC (t = 12 days) | | | | | | | | |
| SikaTack ®-Ultrafast | 5 | 5 | 5 | 5 | 5 | 5 | 5 | 2 |
| Sikaflex ®-250 DM-1 | 5 | 5 | 5 | 5 | 5 | 5 | 5 | 2 |

It is clearly apparent from Table 2 that the Example PR8, as an inventive primer composition, exhibits consistently excellent adhesion on all problematic substrates, especially PDMS-PC and PC, in comparison to the comparative examples. Particular note should be taken, with regard to this comparison, of the long influence of the long open times of the Compositions according to the invention. Although it is apparent that for certain comparative examples such as PR4 and PR5 good adhesion is exhibited at short waiting times, at longer waiting times, however, this is no longer the case. Good adhesion at long waiting times is achievable only with compositions according to the invention, as illustrated by Example PR8.

The invention claimed is:
1. A primer composition comprising:
   (i) at least one polyurethane prepolymer A having isocyanate end groups;
   (ii) at least one aliphatic polyisocyanate B;
   (iii) at least one aromatic polyisocyanate C; and
   (iv) at least one reaction product D obtained from at least one epoxysilane and at least one aminosilane or from at least one epoxysilane and at least one mercaptosilane.

2. The primer composition of claim 1, wherein the polyurethane prepolymer A is prepared from at least one polyol and at least one polyisocyanate.

3. The primer composition of claim 2, wherein the polyol is a polyoxyalkylene polyol.

4. The primer composition of claim 3, wherein the polyol is a polyoxypropylene polyol.

5. The primer composition of claim 2 wherein the polyol has a molecular weight of 250-20 000 g/mol.

6. The primer composition of claim 1, wherein the aliphatic polyisocyanate B is an aliphatically NCO-bearing isocyanurate B1 and/or an aliphatically NCO-bearing biuret B2.

7. The primer composition of claim 6, wherein the aliphatic NCO-bearing isocyanurate B1 is an IPDI-isocyanurate.

8. The primer composition of claim 6, wherein the aliphatically NCO-bearing biuret B2 is an HDI-biuret.

9. The primer composition of claim 1, wherein the aromatic polyisocyanate C is an aromatically NCO-bearing isocyanurate.

10. The primer composition of claim 9, wherein the aromatic polyisocyanate C is an aromatically NCO-bearing isocyanurate prepared from toluene diisocyanate and hexamethylene diisocyanate.

11. The primer composition of claim 1, wherein the epoxysilane used for preparing the reaction product D is an epoxydimethoxymethylsilane, an epoxytrimethoxysilane or an epoxytriethoxysilane.

12. The primer composition of claim 1, wherein the aminosilane used for preparing the reaction product D is an aminodiethoxymethylsilane, aminodimethoxymethylsilane, aminotrimethoxysilane or an aminotriethoxysilane.

13. The primer composition of claim 1, wherein the reaction product D is prepared from 3-glycidyloxypropyltrimethoxysilane and 3aminopropyltrimethoxysilane.

14. The primer composition of claim 1, wherein for preparing the reaction product D epoxysilane and aminosilane are used in a ratio of the number of active amine hydrogens/number of epoxy groups =3:1-1:3.

15. The primer composition of claim 1, wherein for preparing the reaction product D epoxysilane and mercaptosilane are used in a ratio of the number of mercapto groups/number of epoxy groups =1.5:1-1:1.5.

16. The primer composition of claim 1, wherein it further comprising at least one solvent which is not isocyanate-reactive at room temperature.

17. The primer composition of claim 16, wherein the solvent is a dialkyl ketone or an alkyl carboxylic ester having C1 to C6 alkyl substituents.

18. The primer composition of claim 17, wherein the solvent is selected from the group consisting of methyl ethyl ketone, acetone, ethyl acetate, butyl acetate, hexyl acetate and diethyl malonate.

19. The primer composition of claim 1, further comprising at least one catalyst.

20. The primer composition of claim 1, further comprising at least one silane selected from the group consisting of 3-glycidyloxypropyltrimethoxysilane, 3-glycidyloxypropyltriethoxysilane, 2-(3,4-epoxy-cyclohexyl) ethyltrimethoxysilane, 3-ureidopropyltriethoxysilane, 3-(4,5-dihydroimidazolyl)propyltriethoxysilane, 3-methacryloyloxypropyltrimethoxysilane (monomeric or polymerized), vinyltrimethoxysilane (monomeric or polymerized), vinyltriethoxysilane (monomeric or polymerized), vintyltris(2-methoxyethoxy)silane (mono-meric or polymerized), 1,3,5-tris[3-(trimethoxysilyl)propyl]-1,3,5-triazine 2,4,6-( 1H, 3H, 5H)-trione, methyltrimethoxysilane,methyltriethoxysilane,trimethoxypropylsilane, triethoxy propylsilane, 2-methylpropyltrimethoxysilane, triethoxyisobutylsilane, octyltrimethoxysilane, octyltriethoxysilane, hexadecyltrimethoxysilane, cyclohexyldimethoxymethylsilane, 3-isocyanatopropyltrimethoxysilane, 3 -isocyanatopropyltriethoxysilane, 3methacryloyloxy-propyltriethoxysilane (monomeric or polymerized).

21. The primer composition of claim 1, further comprising at least one filler.

22. A method of priming adhesives, sealants or floor coverings, the method comprising:
   applying the primer composition of claim 1 to a surface.

23. A method of priming, the method comprising: applying the primer composition of claim 1 by means of brush, felt, cloth or sponge to a substrate by hand or automatically or by means of robots.

24. The method of claim 23, wherein the substrate is glass, glass ceramic or plastic.

* * * * *